United States Patent
Dai

(10) Patent No.: US 8,717,189 B2
(45) Date of Patent: May 6, 2014

(54) ELECTRONIC DEVICE AND AUTOMATIC WARNING METHOD THEREOF

(75) Inventor: Lung Dai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 612 days.

(21) Appl. No.: 12/961,462

(22) Filed: Dec. 6, 2010

(65) Prior Publication Data

US 2011/0260881 A1 Oct. 27, 2011

(30) Foreign Application Priority Data

Apr. 21, 2010 (TW) .............................. 99112572 A

(51) Int. Cl.
*G08B 21/00* (2006.01)

(52) U.S. Cl.
USPC ............... 340/686.6; 340/540; 340/573.1; 340/539.13; 348/155; 348/553; 348/730; 725/10; 725/12; 725/142

(58) Field of Classification Search
USPC ......... 340/686.6, 540, 573.1, 539.13; 726/19, 726/21; 713/200; 348/155, 553, 730; 725/10, 12, 142

See application file for complete search history.

(56) References Cited

U.S. PATENT DOCUMENTS

| | | | |
|---|---|---|---|
| 6,002,427 A * | 12/1999 | Kipust | 348/156 |
| 6,570,610 B1 * | 5/2003 | Kipust | 348/156 |
| 8,243,141 B2 * | 8/2012 | Greenberger et al. | 348/155 |
| 2005/0086515 A1 * | 4/2005 | Paris | 713/200 |
| 2010/0005526 A1 * | 1/2010 | Tsuji et al. | 726/21 |
| 2010/0099456 A1 * | 4/2010 | Kim | 455/556.1 |
| 2010/0205667 A1 * | 8/2010 | Anderson et al. | 726/19 |

\* cited by examiner

*Primary Examiner* — Hoi Lau
(74) *Attorney, Agent, or Firm* — Novak Druce Connolly Bove + Quigg LLP

(57) ABSTRACT

An electronic device includes a detection unit, a comparison unit, and a warning unit. The detection unit generates a detection signal. The comparison unit determines whether the detection signal exceeds a predetermined detection signal. If it is determined that the detection signal exceeds the predetermined detection signal, the comparison unit generates a first comparison signal indicating the proximity of an object to the electronic device. The warning unit sends a warning message in response to the first comparison signal.

18 Claims, 3 Drawing Sheets

ELECTRONIC DEVICE AND AUTOMATIC WARNING METHOD THEREOF

BACKGROUND

1. Technical Field

The present disclosure relates to electronic devices, and especially to an electronic device capable providing an automatic proximity warning.

2. Description of Related Art

Personal information such as account numbers and passwords is often stored on electronic devices. However, unauthorized observers, such as shoulder surfers, can easily observe and acquire the personal information.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiments of an electronic device providing an automatic warning method. Moreover, in the drawings, like reference numerals designate corresponding parts throughout the views.

DETAILED DESCRIPTION

Embodiments of the present disclosure will now be described in detail with reference to the drawings.

Figure 1:
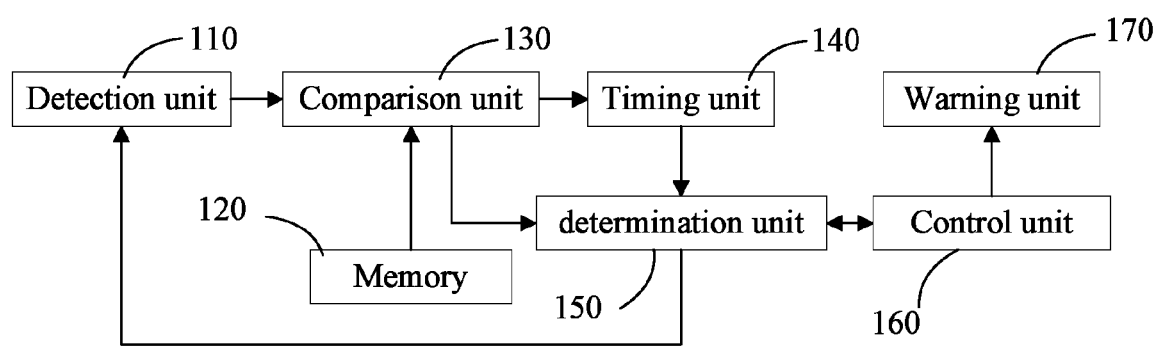
FIG. 1 is a functional block diagram of an electronic device according to an exemplary embodiment.

Referring to FIG. 1, an electronic device 100 according to an exemplary embodiment is illustrated. In this embodiment, the electronic device 100 is a computer. In other embodiments, the electronic device may be a mobile phone, a MP5 player, a DVD player, or other. The electronic device 100 includes a detection unit 110, a memory 120, a comparison unit 130, a timing unit 140, a determination unit 150, a control unit 160, and a warning unit 170.

The detection unit 110 generates a detection signal. The detection signal determines whether others in the vicinity of the electronic device 100. In this embodiment, the detection unit 10 is a sonar emitter. In other embodiments, the detection unit 10 can be an infrared displacement sensor or a distance laser sensor.

The comparison unit 130 determines whether the detection signal exceeds a predetermined detection signal. If so, the comparison unit 130 generates a first comparison signal indicating proximity of an object to the electronic device 100. If it is determined that the detection signal is below the predetermined detection signal, the comparison unit 130 generates a second comparison signal indicating the object is not near enough to gather information entered or displayed on the electronic device 100. The predetermined detection signal is stored in the memory 120, and can be enacted at will.

The timing unit 140 is activated to generate an elapsed time value in response to the first comparison signals of the comparison unit 130. The timing unit 140 keeps timing until the first comparison signal disappears.

The determination unit 150 determines whether the elapsed time value exceeds a predetermined value. If it is determined that the elapsed time value exceeds the predetermined value, the determination unit 150 generates a first determination signal. If it is determined that the elapsed time value is less than the predetermined value, the determination unit 150 generates a second determination signal. The predetermined value is stored in the memory 120, and can be renewed as needed.

The control unit 160 receives the first determination signal, generates a driving signal accordingly, and determines whether the warning unit 170 is enabled. If so, the control unit 160 directly outputs the driving signal to the warning unit 170. The warning unit 170 issues a message in response to the driving signal and advising of the object's proximity. If not, the control unit 160 activates the warning unit 170 to receive the driving signal.

The warning unit 170 can repeat the message several times. The warning unit 170 can generate an audio warning message played through system speakers. Alternatively, the warning unit 170 can be a video warning message or a warning image or a mechanical/physical alarm such as vibrations.

When one of the driving signal, the second comparison signal, and the second determination is received by the determination unit 150, the determination unit 150 accordingly determines whether the detection unit 110 is needed to continue detecting others in the vicinity of the electronic device 100. If so, the determination unit 150 generates a returning signal activating the detection unit 110. If not, the determination unit 150 generates an ending signal.

The control unit 160 further receives the ending signal, and determines whether the warning unit 170 is turned on accordingly. If not, the procedure is ended. If so, the control unit 160 shuts down the warning unit 170.

As described, objects in the vicinity of the electronic device 100 for a predetermined time will cause the warning unit 170 to generate a warning message.

Figure 2:
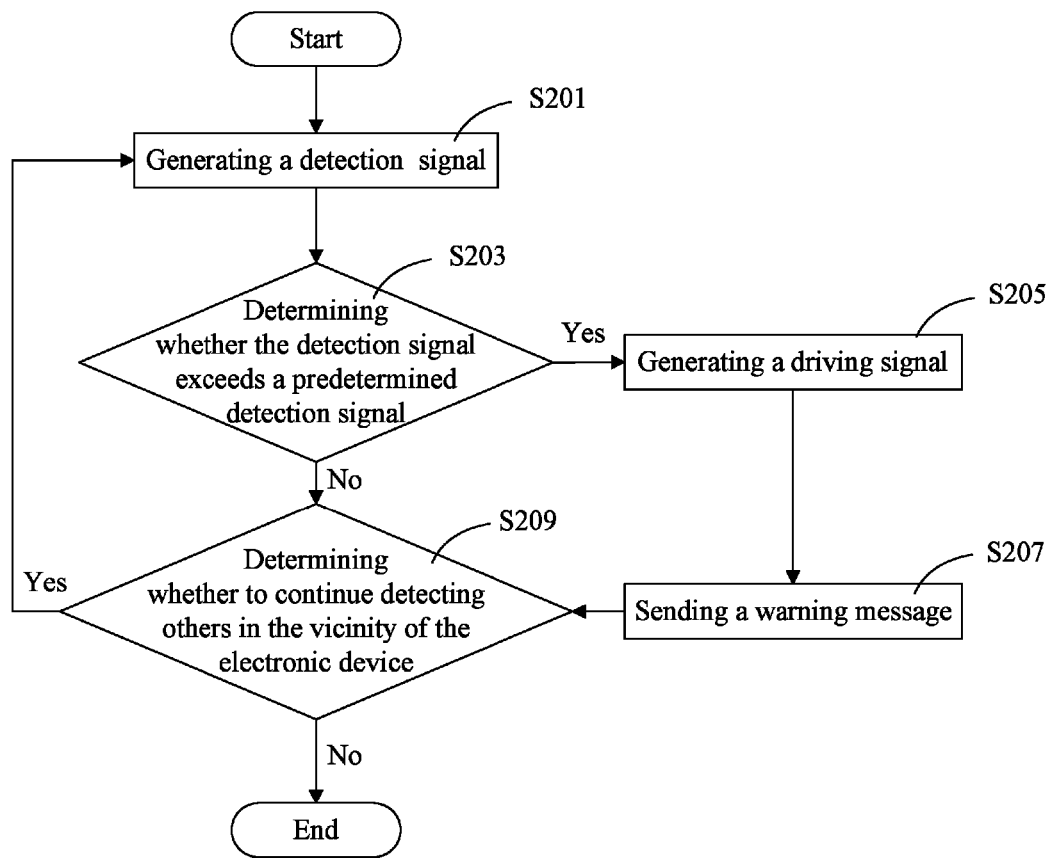
FIG. 2 is a flowchart of an automatic warning method for an electronic device according to a first exemplary embodiment.

Referring to FIG. 2, an automatic warning method for an electronic device 100 generates a message when objects are detected in the vicinity of the electronic device 100, as follows.

In step S201, generating a detection signal. It is implemented by the detection unit 110 of the electronic device 100.

In step S203, determining whether the detection signal exceeds a predetermined detection signal. If it is determined that the detection signal exceeds the predetermined detection signal, step S205 is implemented. If it is determined that the detection signal is below the predetermined detection signal, step S209 is implemented. In this embodiment, step S203 is implemented by the comparison unit 130.

In step S205, generating a driving signal. It is implemented by the control unit 160.

In step S207, sending a warning message according to the driving signal, and implementing step S209. It is implemented by the warning unit 170.

In step S209, determining whether to continue detecting others in the vicinity of the electronic device 100. It is implemented by the determination unit 150. If so, step S201 is implemented. Thus, a new loop starts. If not, the procedure is ended.

As discussed above, when others in the vicinity of the electronic device 100, the warning unit 170 will prompt users. Thus, it is convenient to be protected from snooping.

Figure 3:
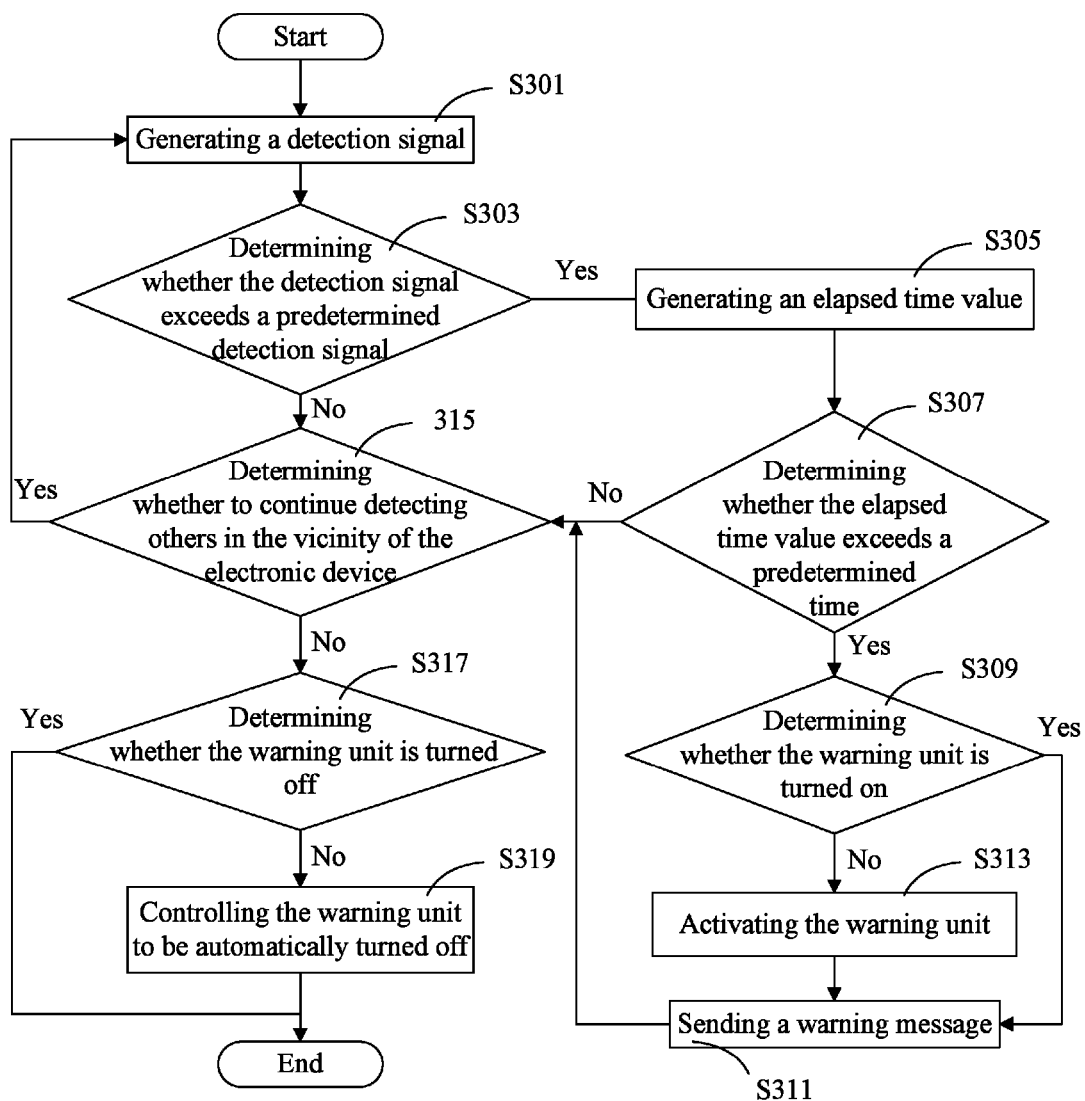
FIG. 3 is a flowchart of an automatic warning method for an electronic device according to a second exemplary embodiment.

Referring to FIG. 3, another automatic warning method is used to control an electronic device 100 to send a warning message when others are in the vicinity of the electronic device 100. The automatic warning method includes the following steps.

In step S301, generating a detection signal. It is implemented by the detection unit 110 of the electronic device 100.

In step S303, determining whether the detection signal exceeds a predetermined detection signal. If so, step S305 is implemented. If not, step S315 is implemented. In this embodiment, step S303 is implemented by the comparison unit 130.

In step S305, generating an elapsed time value. It is implemented by the timing unit 140.

In step S307, determining whether the elapsed time value exceeds a predetermined value. It is implemented by the determination unit 150. If so, step S309 is implemented. If not, step S315 is implemented.

In step S309, determining whether the warning unit 170 is turned on. It is implemented by the control unit 160. If so, step S311 is implemented. If not, step S313 is implemented.

In step S311, sending a warning message and implementing step S315. It is implemented by the warning unit 170.

In step S313, activating the warning unit 170 to implement step S311. It is implemented by the control unit 160.

In step S315, determining whether to continue detecting others in the vicinity of the electronic device 100. It is implemented by the determination unit 150. If so, return to step S301. Thus, a new loop starts. If not, step S317 is implemented.

In step S317, determining whether the warning unit 170 is turned off. It is implemented by the control unit 160. If so, the procedure is ended. If not, step S319 is implemented.

In step S319, controlling the warning unit 170 to be automatically turned off. The procedure is ended.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation to encompass all such modifications and similar arrangements.

What is claimed is:

1. An electronic device, comprising:
   a detection unit for generating a detection signal;
   a comparison unit for determining whether the detection signal exceeds a predetermined detection signal, if it is determined that the detection signal exceeds the predetermined detection signal, the comparison unit generates a first comparison signal indicating the proximity of an object to the electronic device;
   a warning unit;
   a timing unit for generating an elapsed time value in response to the first comparison signal, and further for keeping timing until the first comparison signal disappears;
   a determination unit for determining whether the elapsed time value exceeds a predetermined value, if so, the determination unit generates a first determination signal; and
   a control unit for generating a driving signal in response to the first determination signal;
   wherein the warning unit generates a warning message in response to the driving signal.

2. The electronic device of claim 1, further comprising a control unit for generating a driving signal in response to the first comparison signal, the driving signal used for driving the warning unit to send the warning message.

3. The electronic device of claim 1, further comprising a memory for storing the predetermined detection signal which is capable of being renewed.

4. The electronic device of claim 2, wherein if it is determined that the detection signal is below the predetermined detection signal, the comparison unit generates a second comparison signal indicating the absence of the object is not near enough to gather information entered or displayed on the electronic device.

5. The electronic device of claim 4, further comprising a determination unit, when the determination unit receives one of the driving signal and the second comparison signal, the determination unit determines whether the detection unit is needed to continue detecting others in the vicinity of the electronic device, if so, the determination unit further generates a returning signal for driving the detection unit to be activated.

6. The electronic device of claim 1, wherein the control unit is further used for determining whether the warning unit is turned on, if so, the control unit directly outputs the driving signal to the warning unit, if not, the control unit activates the warning unit to receive the driving signal.

7. The electronic device of claim 1, wherein if it is determined that the detection signal is below the predetermined detection signal, the comparison unit generates a second comparison signal, if it is determined that the elapsed time value is below a predetermined value, the determination unit generates a second determination signal, when the determination unit receives one of the driving signal, the second comparison signal, and the second determination signal, the determination unit further accordingly determines whether the detection unit is needed to continue detecting others in the vicinity of the electronic device, if so, the determination unit further generates a returning signal in order to activate the sending unit.

8. The electronic device of claim 7, wherein if it is determined that the detection unit is not needed to continue detecting others in the vicinity of the electronic device, the determination unit generates an ending signal, the control unit controls the warning unit to be automatic turned off according to the ending signal.

9. An automatic warning method used in an electronic device, the method used for sending a warning message by a warning unit of the electronic device if others are in the vicinity of the electronic device, the method comprising:
   generating a detection signal;
   determining whether the detection signal exceeds a predetermined detection signal;
   if it is determined that the detection signal exceeds the predetermined detection signal, generating a first comparison signal indicating the proximity of an object to the electronic device;
   generating an elapsed time value in response to the first comparison signal, and further for keeping timing until the first comparison signal disappears;
   determining whether the elapsed time value exceeds a predetermined value, if it is determined that the elapsed time value exceeds a predetermined value, generating a first determination signal indicating the proximity of an object to the electronic device;
   generating a driving signal in response to the first determination signal; and
   sending a warning message in response to the driving signal.

10. The method of claim 9, further comprising:
    generating a driving signal, which is used for driving the warning unit to send the warning message, in response to the first comparison signal.

11. The method of claim 9, further comprising:
    if it is determined that the detection signal is below the predetermined detection signal, generating a second comparison signal indicating the object is not near enough to gather information entered or displayed on the electronic device.

12. The method of claim 11, further comprising:

when one of the driving signal and the second comparison signal is received, determining whether to continue detecting others in the vicinity of the electronic device; and if it is determined to continue detecting others in the vicinity of the electronic device, generating a returning signal to the step of generating a detection signal.

13. The method of claim 9, further comprising:

determining whether the warning unit is turned on; and if it is determined that the warning unit is turned on, directly outputting the driving signal to the warning unit.

14. The method of claim 13, further comprising:

if it is determined that the warning unit is turned off, activating the warning unit to receive the driving signal.

15. The method of claim 9, further comprising:

if it is determined that the elapsed time value is below a predetermined value, generating a second determination signal indicating the object is not near enough to gather information entered or displayed on the electronic device.

16. The method of claim 15, further comprising:

if it is determined that the detection signal is below the predetermined detection signal, generating a second comparison signal indicating the object is not near enough to gather information entered or displayed on the electronic device.

17. The method of claim 16, further comprising:

when one of the second comparison signal, the driving signal, and the second determination signal is received, determining whether to continue detecting others in the vicinity of the electronic device accordingly; and if it is determined to continue detecting others in the vicinity of the electronic device, generating a returning signal in order to the step of generating a detection signal.

18. The method of claim 17, further comprising:

if it is determined not to continue detecting others in the vicinity of the electronic device, generating an ending signal; and controlling the warning unit to be automatic turned off according to the ending signal.

* * * * *